United States Patent [19]

Oba et al.

[11] Patent Number: 4,891,305

[45] Date of Patent: Jan. 2, 1990

[54] OPTICAL INFORMATION RECORDING ELEMENT

[75] Inventors: Hideaki Oba; Tsutomu Sato; Masaakira Umehara; Yutaka Ueda, all of Yokohama; Tetsu Yamamuro, Tokyo; Michiharu Abe, Yokohama, all of Japan

[73] Assignee: Ricoh Co., Ltd., Tokyo, Japan

[21] Appl. No.: 217,125

[22] Filed: Jul. 7, 1988

Related U.S. Application Data

[63] Continuation of Ser. No. 33,920, Apr. 1, 1987, abandoned, which is a continuation of Ser. No. 789,065, Oct. 18, 1985, abandoned.

[30] Foreign Application Priority Data

Oct. 23, 1984 [JP]  Japan ................................ 59-221254
Oct. 26, 1984 [JP]  Japan ................................ 59-223849

[51] Int. Cl.[4] ............................................. G03C 1/00
[52] U.S. Cl. ................................. 430/495; 346/76 L; 346/135.1; 428/64; 428/333; 428/336; 428/913; 430/270; 430/346; 430/945
[58] Field of Search ............... 430/346, 495, 945, 269, 430/270; 346/76 L, 135.1; 428/64, 913, 333, 336

[56] References Cited

U.S. PATENT DOCUMENTS 4,415,621 11/1983 Specht et al. ...................... 430/495
4,460,665 7/1984 Kunikane et al. .................. 430/945
4,551,413 11/1985 Bell .................................... 430/495

FOREIGN PATENT DOCUMENTS 82-219090 12/1983 Japan .
WO84/02795 7/1984 World Int. Prop. O. .

OTHER PUBLICATIONS

DataBase Print-Out from World Patent Index for German Offenlegungsschrift No. 3413940, dated Oct. 24, 1985.
DataBase Print-Out from World Patent Index for Japanese Patent Publication No. 82-219090, dated Dec. 20, 1983.

Primary Examiner—Jack P. Brammer
Attorney, Agent, or Firm—Flynn, Thiel, Boutell & Tanis

[57] ABSTRACT

This invention relate to an optical information recording medium, characterized by having an organic thin film recording layer containing at least one of compounds expressed by the general formula (I), (II), (III) and (IV):

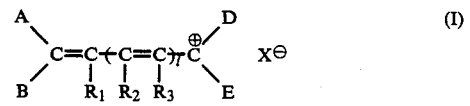

(I)

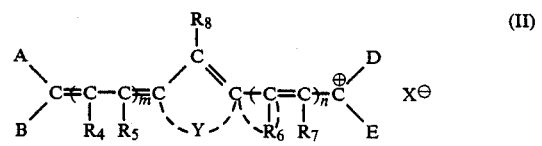

(II)

(wherein in the above formulas, A, B, D and E represent a substituted or non-substituted aryl group; $R_1$ to $R_8$ may be the same or different and represent hydrogen atom, halogen atom or alkyl group; Y represents a divalent residue having atomic groups necessary for forming a five-membered ring or six-membered ring; m, n and l represents 0, 1 or 2; ans $X^-$ represents an acid anion);

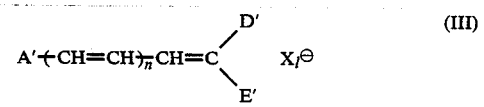

(III)

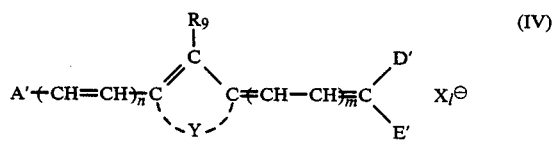

(IV)

(wherein in the above formulas, A' represents a hetero-
(Abstract continued on next page.)

cyclic ring selected from the group of thiazole, oxazole, pyrrole, 3,3-dialkyl indolenine, imidazole, pyridine and quinoline and said heterocyclic ring may be condensed with a benzen ring or naphthalene ring, the aromatic ring of which may have a substituent; D' and E' may be the same or different and represent a substituted or non-substituted aromatic ring or D' and E' may get together to form an aromatic ring or heterocyclic ring; X represents an anion; l represents 0, 1 or 2 and m and n represnt 0, 1, 2 or 3; $R_9$ represents hydrogen, alkyl group, amino group or halogen atom; and Y represents atomic groups necessary for forming a substituted or non-substituted five-membered ring or six-membered ring).

15 Claims, 1 Drawing Sheet

OPTICAL INFORMATION RECORDING ELEMENT

This application is a continuation of U.S. Ser. No. 033 920, filed Apr. 1, 1987, which is a continuation of application Ser. No. 789 065, filed Oct. 18, 1985, both abandoned.

BACKGROUND OF THE INVENTION (a) Field of the Invention

The present invention relates to an optical information recording medium having a recording layer obtained by coating with a solution of the specific compound. Particularly, the present invention relates to a stable optical information recording medium used for writing and reading by a high density energy beam such as laser beam.

(b) Description of the Prior Art

Heretofore, there is known an optical information recording and regenerating apparatus conducting recording and regenerating by irradiating a rotating disclike optical information recording medium with laser light. It has been proposed to use a low-melting metal, a low-melting metal and dielectric material, for example, Te, Bi, or chalcogen type thin film for a recording layer of this type of information recording apparatus. However, these materials have poor preservability since they are weak to oxidation and humidity, and they have various disadvantages in view of low resolving power, low recording density, too high reflectance to laser light, low utilization ratio of laser light, high cost and the like.

Recently, it has been proposed to use an organic coloring matter thin film for a recording layer, the physical and chemical properties of which are changeable by light of relatively long wavelength. This organic coloring matter thin film is free from the the above mentioned faults, but an organic coloring matter having absorption properties in the long wavelength zone is generally unstable to heat and light.

SUMMARY OF THE INVENTION

The present invention was conceived in order to remove the above mentioned problems of the prior art, and an object of the present invention is to provide an improved stable optical information recording medium containing an organic thin film having satisfactory recording properties. Said organic thin film is excellent in preservation stability and is not degraded even after being repeatedly regenerated.

That is, an object of the present invention is to provide an optical information recording medium, characterized by having an organic thin film recording layer containing at least one of the compounds expressed by the general formula (I), (II), (III) and (IV):

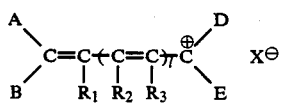   (I)

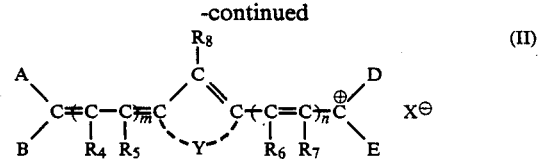

(wherein in the above formulas, A, B, D and E represent a substituted or non-substituted aryl group; $R_1$ to $R_8$ may be the same or different and represent hydrogen atom, halogen atom or alkyl group; Y represents a divalent residue having atomic groups necessary for forming a five-membered ring or six-membered ring; m, n and l represents 0, 1 or 2; and $X^-$ represents an acid anion);

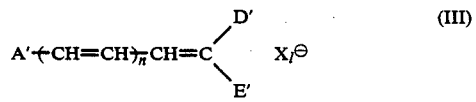

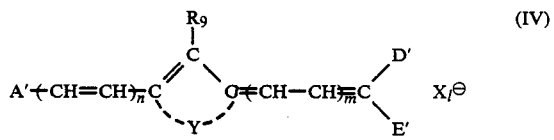

(wherein in the above formulas, A' represents a heterocylic ring selected from the group of thiazole, oxazole, pyrrole, 3,3-dialkyl indolenine, imidazole, pyridine and quinoline and said heterocyclic ring may be condensed with a benzene ring or naphthalene ring, the aromatic ring of which may have a substituent; D' and E' may be the same or different and represent a substituted or non-substituted aromatic ring of D' and E' may get together and form an aromatic ring or heterocyclic ring; X represents an anion; l represents 0, 1 or 2 and m and n represent 0, 1, 2 or 3; $R_9$ represents hydrogen, alkyl group, amino group or halogen atom; and Y represents atomic groups necessary for forming a substituted or non-substituted five-membered ring or six-membered ring).

DETAILED DESCRIPTION OF THE INVENTION

Figure 1:
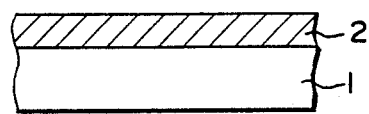
FIGS. 1 to 4 are sectional views illustrating a structure of the optional information recording medium of the present invention.

The recording layer of the optical information recording medium of the present invention is characterized by containing at least one of compounds expressed by the following general formula (I), (II), (III) and (IV).

General Formula (I)

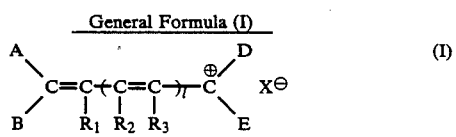  (I)

General Formula (II)

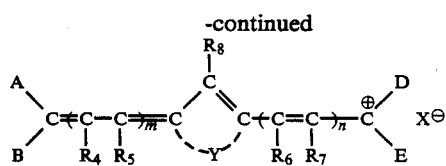

(II)

wherein in the above formulas, A, B, D and E represent a substituted or non-substituted aryl group; $R_1$ to $R_8$ may be the same or different and represent hydrogen atom, halogen atom or alkyl group; Y represents a divalent residue having atomic groups necessary for forming a five-membered ring or six-membered ring; m, n and l represent 0, 1 or 2; and $X^-$ represents an acid anion.

Typical examples of the compounds of the present invention as expressed by the general formulas (I) and (II) are listed below, but are not limited thereto.

| Compound No. | A | B | D | E | l | $R_1$ | $R_2$ | $R_3$ | X |
|---|---|---|---|---|---|---|---|---|---|
| 1 | —Ph | —Ph | —Ph | —Ph | 2 | H | H | H | $ClO_4$ |
| 2 | —Ph-$N(CH_3)_2$ | —Ph | —Ph-$N(CH_3)_2$ | —Ph | 2 | H | H | H | Cl |
| 3 | —Ph | —Ph-Cl | —Ph | —Ph-Cl | 2 | H | H | H | Cl |
| 4 | —Ph | —Ph-$OCH_3$ | —Ph | —Ph-$OCH_3$ | 2 | H | H | H | $ClO_4$ |
| 5 | —Ph-Cl | —Ph-Cl | —Ph-Cl | —Ph-Cl | 2 | H | H | H | Br |
| 6 | —Ph(Cl)(Cl) | —Ph | —Ph(Cl)(Cl) | —Ph | 2 | H | H | H | $ClO_4$ |
| 7 | —Ph | —Ph-Cl | —Ph | —Ph-Cl | 2 | H | H | H | $ClO_4$ |
| 8 | —Ph(Cl)(Cl) | —Ph-$N(CH_3)_2$ | —Ph(Cl)(Cl) | —Ph-$N(CH_3)_2$ | 2 | H | H | H | $ClO_4$ |
| 9 | —Ph-Cl | —Ph-$OCH_3$ | —Ph-Cl | —Ph-$OCH_3$ | 2 | H | H | H | $ClO_4$ |
| 10 | —Ph | —Ph | —Ph | —Ph | 2 | H | H | H | $H_3C$-Ph-$SO_3$ |
| 11 | —Ph-$OCH_3$ | —Ph | —Ph-$OCH_3$ | —Ph | 2 | H | H | H | $C_2H_5SO_4$ |
| 12 | —Ph-$N(CH_3)_2$ | —Ph-$N(CH_3)_2$ | —Ph-$N(CH_3)_2$ | —Ph-$N(CH_3)_2$ | 2 | H | H | H | $ClO_4$ |
| 13 | naphthyl | naphthyl | naphthyl | naphthyl | 1 | H | H | H | $ClO_4$ |
| 14 | Cl-naphthyl | Cl-naphthyl | Cl-naphthyl | Cl-naphthyl | 1 | H | H | H | $ClO_4$ |

| Compound No. | A | B | D | E | m | n | R4 | R5 | R6 | R7 | R8 | Y | X |
|---|---|---|---|---|---|---|---|---|---|---|---|---|---|
| 15 | C₆H₅ | C₆H₅ | C₆H₅ | C₆H₅ | 1 | 1 | H | H | H | H | H | cyclopentenyl | ClO₄ |
| 16 | C₆H₅ | C₆H₅ | C₆H₅ | C₆H₅ | 1 | 1 | H | H | H | H | H | cyclohexenyl | ClO₄ |
| 17 | C₆H₅ | C₆H₅ | C₆H₅ | C₆H₅ | 1 | 1 | H | H | H | H | H | bicyclic (indanyl) | ClO₄ |
| 18 | 4-Cl-C₆H₄ | C₆H₅ | 4-Cl-C₆H₄ | C₆H₅ | 1 | 1 | H | H | H | H | Cl | cyclohexenyl | ClO₄ |
| 19 | 4-N(CH₃)₂-C₆H₄ | C₆H₅ | 4-N(CH₃)₂-C₆H₄ | C₆H₅ | 1 | 1 | H | H | H | H | Cl | cyclohexenyl | ClO₄ |
| 20 | 4-OCH₃-C₆H₄ | C₆H₅ | 4-OCH₃-C₆H₄ | C₆H₅ | 1 | 1 | H | H | H | H | Cl | cyclohexenyl | ClO₄ |
| 21 | 4-N(CH₃)₂-C₆H₄ | 4-N(CH₃)₂-C₆H₄ | 4-N(CH₃)₂-C₆H₄ | 4-N(CH₃)₂-C₆H₄ | 1 | 1 | H | H | H | H | Br | cyclohexenyl | ClO₄ |
| 22 | 4-N(CH₃)₂-C₆H₄ | 4-N(CH₃)₂-C₆H₄ | 3,4-Cl₂-C₆H₃ | 3,4-Cl₂-C₆H₃ | 1 | 1 | H | H | H | H | Br | cyclohexenyl | ClO₄ |
| 23 | C₆H₅ | C₆H₅ | C₆H₅ | C₆H₅ | 1 | 1 | H | H | H | H | H | cyclohexenyl | ClO₄ |
| 24 | 4-Cl-C₆H₄ | 4-Cl-C₆H₄ | 4-OCH₃-C₆H₄ | 4-Cl-C₆H₄ | 1 | 1 | H | H | H | H | H | cyclohexenyl | ClO₄ |
| 25 | 4-Cl-C₆H₄ | C₆H₅ | 4-Cl-C₆H₄ | C₆H₅ | 1 | 1 | H | H | H | H | Cl | cyclohexenyl | Cl |
| 26 | C₆H₅ | C₆H₅ | C₆H₅ | C₆H₅ | 1 | 1 | H | H | H | H | Cl | cyclohexenyl | 4-H₃C-C₆H₄-SO₃ |

-continued

| Compound No. | A | B | D | E | m | n | R4 | R5 | R6 | R7 | R8 | Y | X |
|---|---|---|---|---|---|---|---|---|---|---|---|---|---|
| 27 | —⌬—N(CH₃)₂ | —⌬—N(CH₃)₂ | —⌬—N(CH₃)₂ | —⌬—N(CH₃)₂ | 1 | 1 | H | H | H | H | Cl | ⬡ | CH₃SO₄ |
| 28 | ⌬ | ⌬ | ⌬ | ⌬ | 2 | 0 | H | H | H | H | H | ⬠ | ClO₄ |

General Formula (III)

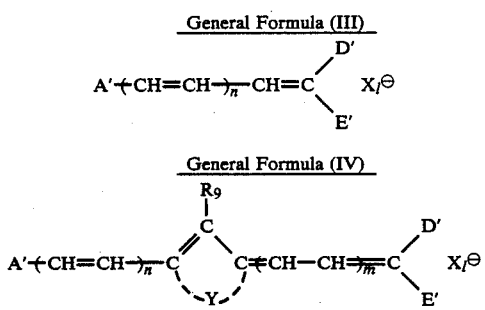

General Formula (IV)

wherein in the above formulas A' represents a heterocyclic ring selected from the group of thiazole, oxazole, pyrrole, 3,3-dialkyl indolenine, imidazole, pyridine and quinoline and said heterocyclic ring may be condensed with a benzene ring or naphthalene ring, the aromatic ring of which may have a substituent; D' and E' may be the same or different and represent a substituted or non-substituted aromatic ring or D' and E' may get together and form an aromatic ring or heterocyclic ring; X represents an anion; l represents 0, 1 or 2 and m and n represent 0, 1, 2 or 3; $R_9$ represents hydrogen, alkyl group, amino group or halogen atom; and Y represents atomic groups necessary for forming a substituted or non-substituted five-membered ring of six-membered ring.

In the above general formulas (III) and (IV), A' representing a heterocyclic ring can be expressed by the formula,

wherein $R_{10}$ represents an alkyl group (for example, methyl, ethyl, n-propyl, isopropyl, n-butyl, secondary butyl, isobutyl, tertiary butyl, n-amyl, tertiary amyl, n-hexyl, n-octyl, tertiary octyl and the like), a substituted alkyl group (for example, 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, 3-(acetylsulfamyl)propyl, 4-(acetylsulfamyl)butyl and the like), a cycloalkyl group (for example, cyclohexyl and the like), an alkenyl group such as allyl group ($CH_2=CH-CH_2-$), an aralkyl group (for example, benzyl, phenethyl, alpha-naphthylmethyl, β-naphthylmethyl and the like), a substituted aralkyl group (for example, carboxybenzyl, sulfobenzyl, hydroxybenzyl and the like), an aryl group (for example, phenyl and the like), or a substituted aryl group (for example, carboxyphenyl, sulfophenyl, hydroxyphenyl and the like); and Z represents non-metallic atomic groups necessary for forming a substituted or non-substituted heterocyclic ring, for example, a thiazole type nucleus (for example, thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole and the like), a benzothiazole type nucleus (for example, benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-dioxymethylene benzothiazole, 5-hydroxybenzothiazole, 6-hydroxy benzothiazole, 4,5,6,7-tetrahydrobenzothiazole and the like), a naphthothiazole type nucleus (for example, naphtho(2.1-d)thiazole, naphtho(1.2-d)thiazole, 5-methoxynaphtho(1.2-d)thiazole, 5-ethoxynaphtho(1.2-d)thiazole, 8-methoxynaphtho(2.1-d)thiazole, 7-methoxynaphtho(2.1-d)thiazole and the like), a thionaphthene 7.6-d)thiazole type nucleus (for example, 7-methoxythionaphthene(7.6-d)thiazole and the like), an oxazole type nucleus (for example, 4-methyloxazole, 5-methyloxazole, 4-phenyloxazole, 4,5-diphenyl oxazole, 4-ethyloxazole, 4,5-dimethyloxazole, 5-phenyloxazole and the like), a banzoxazole type nucleus (for example, benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole, 6-hydroxybenzoxazole and the like), a naphthoxazole type nucleus (for example, naphtho(2.1-d)oxazole, naphtho(1.2-d)oxazole and the like), a selenazole type nucleus (for example, 4-methylselenazole, 4-phenylselenazole and the like), a benzoselenazole type nucleus (for example benzoselenazole, 5-chlorobenzoselenazole, 5-methylbenzoselenazole, 5,6-dimethylbenzoselenazole, 5-methoxy benzoselenazole, 5-methyl-6-methoxybenzoselenazole, 5,6-dioxymethylene benzoselenazole, 5-hydroxy benzoselenazole, 4,5,6,7-tetrahydroxybenzoselenazole, and the like), a naphthoselenazole type nucleus (for example naphtho(2.1-d)selenazole, naphtho(1.2-d)selenazole, and the like), a thiazoline type nucleus (for example thiazoline, 4-methylthiazoline, 4-hydroxymethyl-4-methylthiazoline, 4,4-bis-hydroxy methylthiazoline and the like), an oxazoline type nucleus (for example oxazoline), a selenazoline type nucleus (for example selenazoline), a 2-quinoline type nucleus (for example quinoline, 6-methyl quinoline, 6-chloroquinoline, 6-methoxyquinoline, 6-ethoxyquinoline, 6-hydroxyquinoline and the like), a 4-quinoline type nucleus (for example, quinoline, 6-methoxyquinoline, 7-methylquinoline, 8-methylquinoline and the like), a 1-isoquinoline type nucleus (for example, isoquinoline, 3,4-dihydroisoquinoline and the like), a 3-isoquinoline type nucleus (for example isoquinoline), a 3,3-dialkyl indolenine type nucleus (for example, 3,3-dimethyl indolenine, 3,3-dimethyl-5-chloroiodolenine, 3,3,5-trimethylindolenine, 3,3,7-trimethylindolenine, 3,3-dimethyl-5,7-dichloroindolenine and the like), a 3,3-dialkylnaphthopyrrole type nucleus (for example, 3,3-dimethylnaphtho(1.2-d)pyrrole, 3,3-dimethyl naphtho(2.1-d) pyrrole, 6-chloro-3.3-dimethyl-naphtho(1.2-d) pyrrole, and the like), a pyridine type nucleus (for example, pyridine, 5-methylpyridine and the like), and a benzoimidazole type nucleus (for example 1-ethyl-5,6-dichlorobenzoimidazole, 1-hydroxyethyl-5,6-dichlorobenzoimidazole, 1-ethyl-5-chlorobenzoimidazole, 1-ethyl-5,6-dibromobenzoimidazole, 1-ethyl-5-phenylbenzoimidazole, 1-ethyl-5-fluorobenzoimidazole, 1-ethyl-5-cyanobenzoimidazole, 1-(β-acetoxyethyl)-5-cyanobenzoimidazole, 1-ethyl-5-chloro-6-cyanobenzoimidazole, 1-ethyl-5-fluoro-6-cyanobenzoimidazole, 1-ethyl-5-acetylbenzoimidazole, 1-ethyl-5-carboxybenzoimidazole, 1-ethyl-5-ethoxycarbonyl benzoimidazole, 1-ethyl-5-sulfamylbenzoimidazole, 1-ethyl-5-N-ethylsulfamylbenzoimidazole, 1-ethyl-5,6-diflurorobenzoimidazole, 1-ethyl-5,6-dicyanobenzoimidazole, 1-ethyl-5-ethylsulfonylbenzoimidazole, 1-ethyl-5-methylsulfonylbenzoimidazole, 1-ethyl-5-trifluoromethylbenzoimidazole, 1-ethyl-5-trifluoromethylsulfonylbenzoimidazole, 1-ethyl-5-trifluoromethylsulfinylbenzoimidazole, and the like).

Examples of

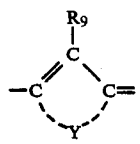

in the above general formula (IV) include the following 5-membered ring and 6-membered ring compounds.

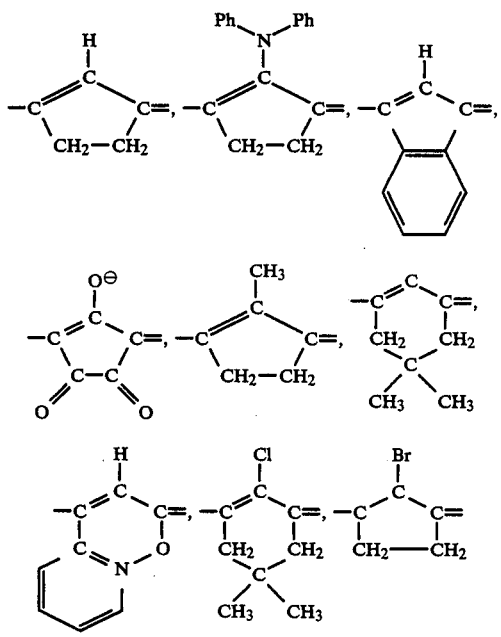

Examples of a substituted or non-substituted aromatic ring as expressed by D' and E' in the above general formulas (III) and (IV) include phenyl group, 4-chlorophenyl group, 4-dimethylaminophenyl group, 4-diethylamino group, 4-dibenzylaminophenyl group and the like.

Examples of an aromatic ring and a heterocyclic ring formed by bonding D' and E' together include as follows:

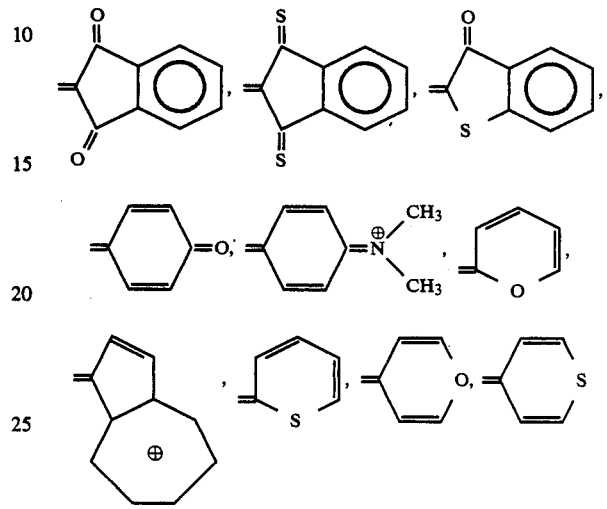

The above rings may have a substituent such as an alkyl group, halogen atom, alkoxy group, substituted or non-substituted aryl group and the like.

Examples of X representing an anion include an acid anion such as a halogen ion (for example, fluorine ion, chlorine ion, bromine ion and iodine ion), perchlorinate ion, benzene sulfonate ion, p-toluene sulfonate ion, methyl sulfate ion, ethyl sulfate ion, propyl sulfate ion and the like.

Typical examples of the compounds of the present invention as expressed by the above general formulas (III) and (IV) are listed hereinbelow, but are not limited thereto.

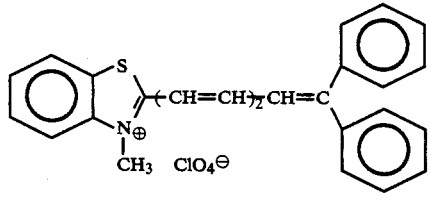

Compound No. 29

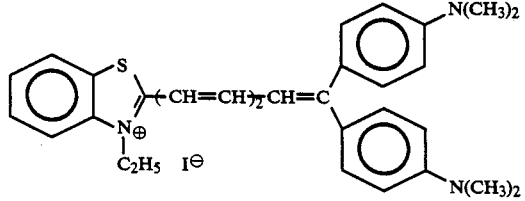

Compound No. 30

-continued
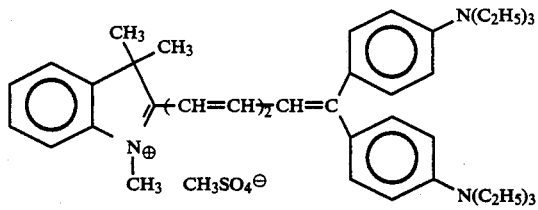
Compound No. 31
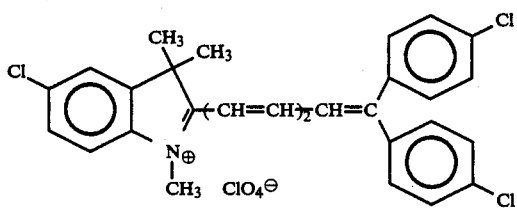
Compound No. 32
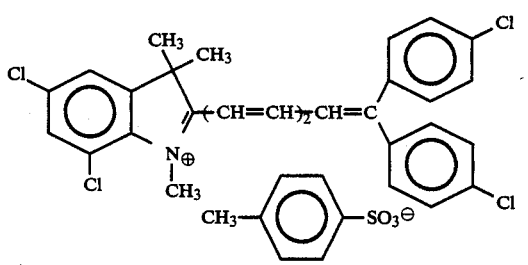
Compound No. 33
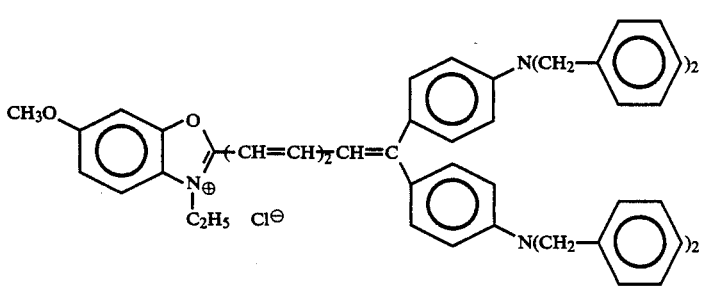
Compound No. 34
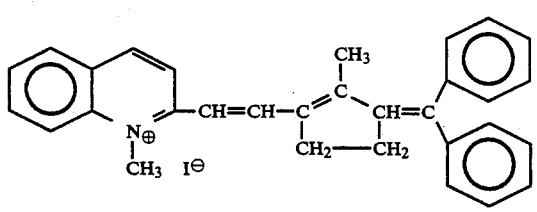
Compound No. 35
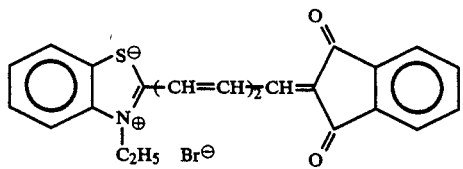
Compound No. 36
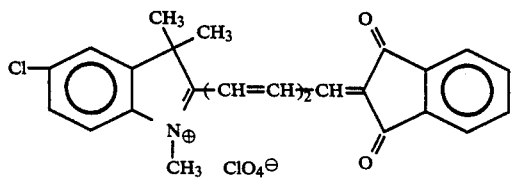
Compound No. 37

-continued
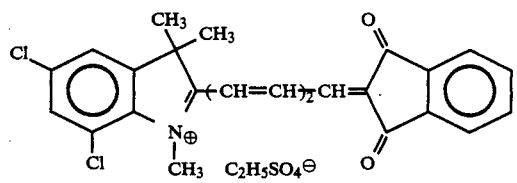
Compound No. 38
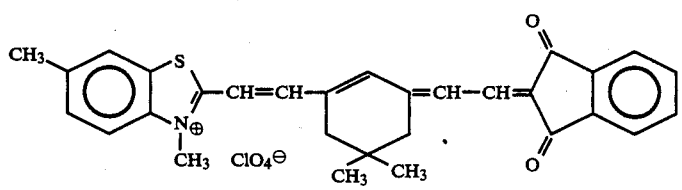
Compound No. 39
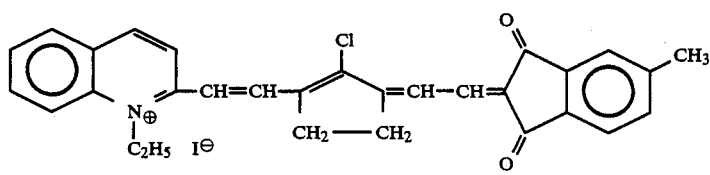
Compound No. 40
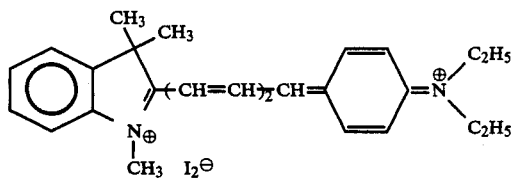
Compound No. 41
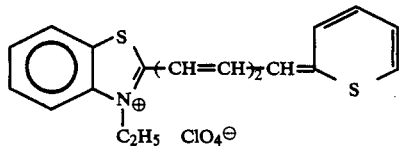
Compound No. 42
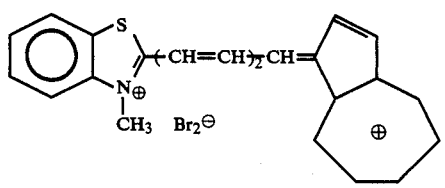
Compound No. 43
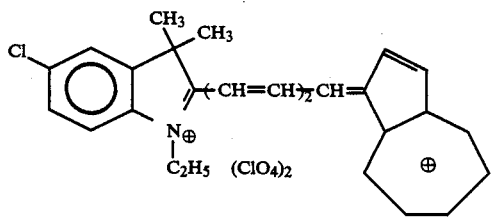
Compound No. 44
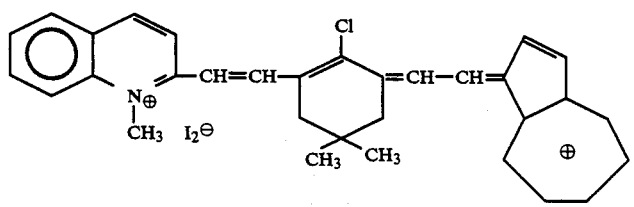
Compound No. 45

-continued

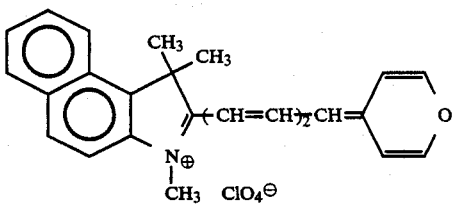

Compound No. 46

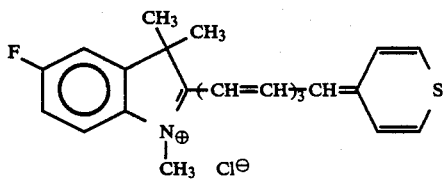

Compound No. 47

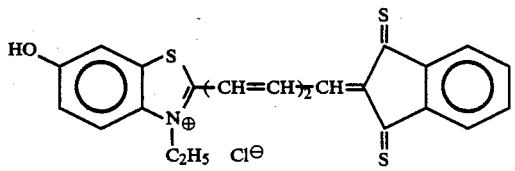

Compound No. 48

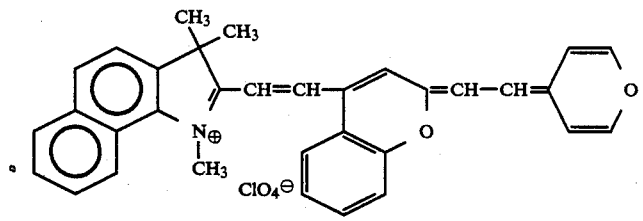

Compound No. 49

The compounds of the present invention as expressed by the above formulas can be synthesized by reacting A'-CH$_3$ and

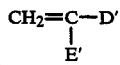

with a diamino compound, a dihydroxy compound or a trimethoxy compound, which forms an intermediate chain.

According to the present invention, a solution containing the compounds as expressed by the general formulas (I), (II), (III) and/or (IV) as the main component is coated on a substrate insoluble to a solvent or treated in such a manner as to become insoluble to a solvent, thus producing a recording layer having a uniform film thickness and a uniform light-reflectance of 20–30% similar to that of metal.

The optical information recording medium of the present invention is basically composed of a substrate and a recording layer, but if necessary, it may be further provided with an underlayer between the substrate and the recording layer, and a protective layer on the recording layer.

According to the present invention, some optical change is caused on a recording layer by being irradiated with laser light, and information is recorded on the basis of this optical change. It is necessary to incorporate the above mentioned compounds as expressed by the general formulas (I), (II), (III) and/or (IV) as the main component in the recording layer. These compounds can be used alone or in a mixture of two or more. The coloring matters of the present invention are very highly reflective in themselves, and therefore it is generally not necessary to use a reflective layer. If desired, the above compounds of the present invention may be used in the form of a mixture, dispersion or lamination with other dyes such as phthalocyanine type dye, tetrahydrocholine type dye, dioxazine type dye, triphenothiazine type dye, phenanthrene type dye, cyanine (merocyanine) type dye, anthraquinone (indanthrene) type dye, xanthene type dye, triphenylmethane type dye, croconium type dye, pyrylium type dye, azulene type dye and the like or other metals and metal compounds such as In, Sn, Te, Bi, Al, Se, TeO$_2$, SnO, As, Cd and the like.

The recording layer of the present invention may further contain resin, stabilizer, dispersing agent, fire retardant, lubricant, antistatic agent, surface active agent, plasticizer, and the like. The light stability of a recording layer containing a stabilizer, particularly a triaryl amino compound or a transition metal complex having absorption in the longer wave-length zone is highly improved.

Examples of the resin as a binder include nitrocellose, polyvinyl butyral, polyvinyl alcohol, vinyl chloride-vinyl acetate copolymer, polystyrene, polybutadiene, silicone resin, acryl resin, polyvinyl acetate and the like.

Examples of the transition metal complexes include compounds having the following general formula, or quaternary ammonium salt thereof:

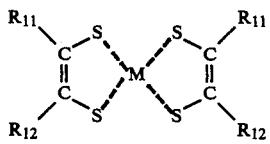

wherein M is a transition metal selected from the group consisting of nickel, platinum and palladium, $R_{11}$ and $R_{12}$ can be the same or different and each is alkyl, phenyl, alkyl-substituted phenyl, alkoxy-substituted phenyl or dialkylaminophenyl, or $R_{11}$ and $R_{12}$ may cooperate to form a ring, more particular examples of which include bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl) nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium, bis(1,4-dimethyl-2,3-dithiophenyl)palladium tetrabutylammonium, and the like.

Examples of the triaryl amines include the compounds expressed by the following general formula,

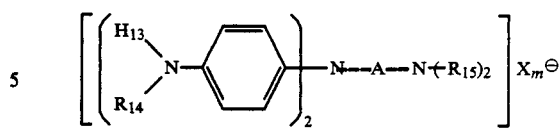

wherein $R_{13}$ and $R_{14}$ represent hydrogen or a lower alkyl group; X represents an anion selected from the group of hexafluoroarsenic acid ion, hexafluoroantimonic acid ion, fluoroboric acid ion and perchloric acid ion; m represents 0, 1 or 2; and $R_{15}$ represents hydrogen, a lower alkyl or the group of

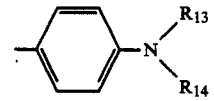

($R_{13}$ and $R_{14}$ are the same as defined above); and A represents

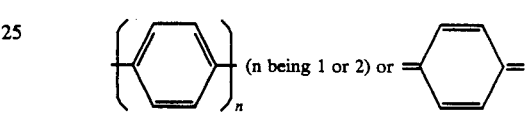

(when m is 2).

Typical examples of triaryl amines include as follows:

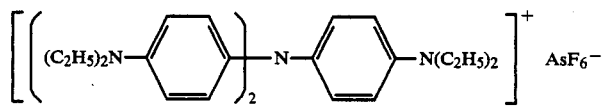

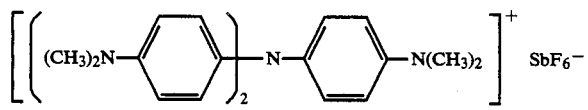

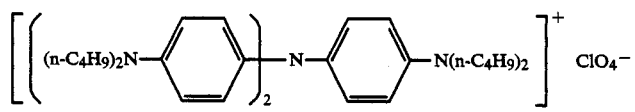

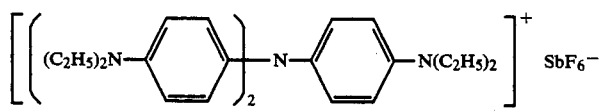

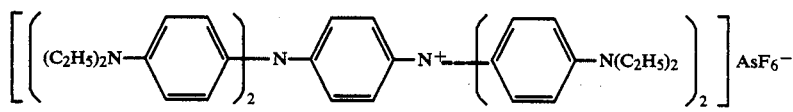

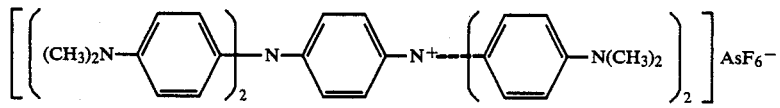

-continued

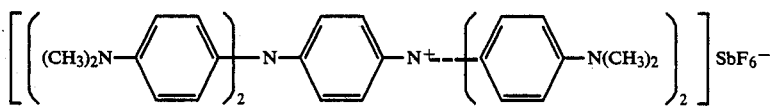

The recording layer of the present invention is provided by coating with a solution having the compound(s) of the above general formulas (I), (II), (III) and/or (IV) alone dissolved in a solvent or having a mixture of said compound(s) with other components such as dye and the like in a solvent. Examples of the coating method include dip coating, spray coating, spinner coating, blade coating, roller coating, curtain coating and the like. Any solvent can be used for this purpose, provided that it dissolves the compound of the above general formula of this invention, but it is preferable to use a solvent having a high dissolving power in order to obtain a film having a good uniformity and a high reflectance. Examples of the solvent used generally include alcohols such as methanol, ethanol, isopropanol and the like; ketones such as acetone, methylethylketone, cyclohexanone and the like; amides such as N,N-dimethylformamide, N,N-dimethylacetoamide and the like; sulfoxides such as dimethylsulfoxide and the like; ethers such as methyl cellosolve, tetrahydrofuran, dioxane, ethyleneglycol monomethylether and the like; esters such as methylacetate, ethylacetate and the like; halogenated aliphatic hydrocarbons such as chloroform, methylene chloride, dichloroethane, carbon tetrachloride, trichloroethane and the like; and aromatics such as benzene, toluene, xylene, ligroin, monochlorobenzene, dichlorobenzene and the like.

The formation of the recording layer can also be effected by other coating methods such as vapor-deposition, CVD, sputtering and the like.

The recording layer of the present invention has a thickness of 100 Å–10 μm, preferably 200 Å–2 μm. The thickness of the recording layer is determined preferably in such a manner as to make the reflectance at least 15% in the wave length of regeneration laser.

A substrate used in the present invention should be transparent to laser light when writing and recording are carried out from the substrate side, but need not be transparent to laser light when they are carried out from the recording layer side. Examples of the substrate include glass; plastics such as polyester, polyamide, polyolefin, polycarbonate, epoxy, polyimide, polymethyl methacrylate, and the like; metals; ceramics; and the like. However, it is necessary that the substrate is insoluble to the solvent used to dissolve the compound of the above general formulas (I) to (IV) of the present invention.

Among substrate materials, a substrate soluble in a solvent must be subjected to such a treatment as to make it insoluble in a solvent. The treatment can be effected by providing an underlayer as mentioned below or by electromagnetic wave irradiation.

The substrate can be used in any form of tape, disk, drum, belt and the like.

The optical information recording medium of the present invention is basically composed of a substrate having a recording layer applied thereon, but if necessary, other layers such as underlayer, intermediate layer, protective layer or the like may further be applied depending on the use. An underlayer provided between a substrate and a protective layer may have a guide groove if necessary. A recording layer may be applied not only on one side of a substrate but on both sides of a substrate. The optical information recording medium may have a so called sandwich structure comprising a pair of recording mediums placed in such a manner as to have the two recording layers facing each other in the inside in order to protect the recording layer from damages and dust. When a transparent substrate is used, other layers such as a reflective layer, various uppermost protective layer, half-mirror layer and the like may further be applied on the recording layer if necessary. However, The compounds of the present invention are very highly reflective in themselves, and therefore it is generally not necessary to provide such a reflective layer.

The underlayer is used for the purposes of (a) improving adhesion, (b) using as a barrier for water, gas, and the like, (c) improving preservation stability of the recording layer, (d) improving reflectance, (e) protecting a substrate from solvent, and (f) forming a pregroove, and the like. For the purpose of (a), various materials can be used, for example, high molecular compounds such as ionomer resin, polyamide type resin, vinyl type resin, natural high molecular compound, silicone, liquid rubber, and silane coupling agent and the like. For the purposes of (b) and (c), in addition to said high molecular compounds, various inorganic compound can be used, for example, $SiO_2$, $MgF_2$, SiO, $TiO_2$, ZnO, TiN, SiN, and the like, metallic or semi-metallic compounds such as Zn Cu, S, Ni, Cr, Ge, Se, Cd, Ag, Al and the like. For the purpose of (d), metals such as Al, Ag and the like or an organic thin film having a metallic gloss such as methine type dye, xanthene type dye and the like can be used. For the purposes of (e) and (f), ultraviolet ray-curable resin, thermosetting resin, thermoplastic resin and the like can be used.

The underlayer has a thickness of 0.1–30 μm, preferably 0.2–10 μm.

A protective layer is provided for the purposes of protecting a recording layer from damage, dust, dirt and the like and of improving the chemical stability of the recording layer. The same materials as used for an underlayer can also be used for these purposes.

The protective layer generally has a film thickness of at least 0.1 μm, preferably at least 50 μm.

The constitution of the optical information recording medium of the present invention is further illustrated in accordance with the accompanying drawings.

As can be seen from FIG. 1, the optical information recording medium of the present invention basically comprises a recording layer 2 containing at least one of the compounds having the general formulas (I) to (IV) of the present invention applied on a substrate 1. The recording layer may comprise two layers of a light reflective layer and a light absorbing layer placed in any optional order.

Figure 2:
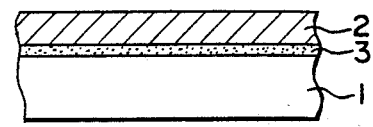
Figure 3:
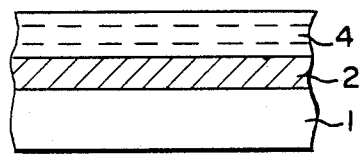
Figure 4:
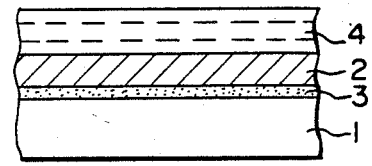

The basic structure of the optical information recording medium of the present invention as shown in FIG. 1 may be modified by further providing an underlayer 3 and/or a protective layer 4 as shown in FIGS. 2 to 4. The underlayer and/or the protective layer may contain the compound of the present invention as expressed by the above general formulas (I) to (IV). The underlayer or the protective layer may also contain a stabilizer, dispersing agent, fire retardant, lubricant, antistatic agent, surface active agent, plasticizer, and the like.

Another structure of the optical information recording medium may comprise two recording mediums of the same structure (one of which may be a substrate only) as shown in FIGS. 1 to 4. This is a so called "air sandwich structure" having the recording layers 2 sealed in the inside.

An optical information recording apparatus can be made smaller when a semi-conductor laser having a wavelength of 750-850 nm is used as a laser light source.

The present invention is further illustrated by the following Examples and Comparative Examples, but is not limited thereto.

EXAMPLE 1

A solution prepared by dissoliving the above listed Compound No. 7 in methyl ethyl ketone was spin-coated on a polymethylmethacrylate substrate ("Acrylite AR" manufactured by Mitsubishi Rayon Co., Ltd.) having a thickness of 1.2 mm to form a recording layer of having a thickness of 750 Å.

EXAMPLES 2 TO 11

Recording mediums were prepared in the same manner as in Example 1, except that the substrates, solvents and the compounds as listed in the following table were used.

| Ex. No. | Substrate | Substrate Treatment | Solvent | Compound No. |
|---|---|---|---|---|
| 2 | Acrylite AR | none | methyl ethyl ketone | 4 |
| 3 | Acrylite AR | none | 1,2-dichloroethane | 12 |
| 4 | Acrylite AR | none | 1,2-dichloroethane | 19 |
| 5 | Acrylite L | light-curable resin (50 μm) | methyl ethyl ketone | 1 |
| 6 | Acrylite L | light-curable resin (50 μm) | methyl ethyl ketone | 25 |
| 7 | Acrylite L | light-curable resin (50 μm) | 1,2-dichloroethane | 18 |
| 8 | Acrylite L | light curable resin (50 μm) | 1,2-dichloroethane | 15 |
| 9 | Acrylite L | SiO$_2$ (2000Å) | 1,2-dichloroethane | 16 |
| 10 | Acrylite L | SiO$_2$ (2000Å) | 1,2-dichloroethane | 27 |
| 11 | Acrylyte L | Te(150° A) | 1,2-dichloro ethane | 7 |

EXAMPLE 12

A solution prepared by dissolving a 1:1 weight ratio mixture of the above listed Compound No. 7 and the coloring matter having the following chemical formula in 1,2-dichloroethane was spin-coated on a polymethylmethacrylate substrate ("Acrylite AR" manufactured by Mitsubishi Rayon Co., Ltd.) having a thickness of 1.2 mm to form a recording layer having a thickness of 750 Å.

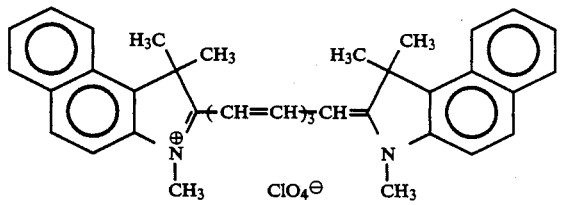

EXAMPLE 13

A solution prepared by dissolving a 1:1 weight ratio mixture of the above listed Compounds No. 7 and No. 12 in 1,2-dichloroethane was spin-coated on a polymethylmethacrylate substrate ("Acrylite AR" manufactured by Mitsubishi Rayon Co., Ltd.) having a thickness of 1.2 mm to form a recording layer having a thickness of 750 Å.

COMPARATIVE EXAMPLE 1

A solution prepared by dissoliving the coloring matter having the following chemical formula in 1,2-dichloroethane was spin-coated on a polymethylmethacrylate substrate ("Acrylite AR" manufactured by Mitsubishi Rayon Co., Ltd.) having a thickness of 1.2 mm to form a recording layer having a thickness of 750 Å.

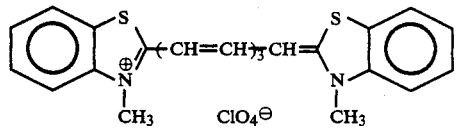

COMPARATIVE EXAMPLE 2

A recording medium was prepared in the same manner as in the above Comparative Example 1, except that the coloring matter was replaced by the coloring matter having the following chemical formula.

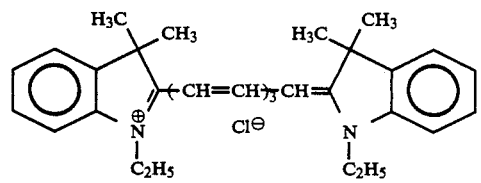

Information was recorded and regenerated on each recording medium prepared in the above Examples and Comparative Examples from the substrate side by a semi-conductor laser light having a wavelength of 790 nm at a recording frequency of 0.5 MHz and a linear velocity of 1.5 m/sec, and the regenerated wave was subjected to spectral analysis (scanning filter, band width=30 KHz) to measure a C/N value.

As a preservation test, the same recording medium was allowed to stand for 3000 hours under the conditions of 60° C. and relative humidity of 90%, and the reflectance and C/N values were then measured.

As a test of degradation of regeneration, the same recording medium was irradiated with a tungsten light of 54000 Lux for 30 hours, and the reflectance and C/N values were then measured.

The reflectance was measured from the substrate side, and the test results are shown in the following table.

|  | Initial Value | | After Preservation Test | | After Regeneration Degradation Test | |
| --- | --- | --- | --- | --- | --- | --- |
|  | Reflectance (%) | C/N (dB) | Reflectance (%) | C/N (dB) | Reflectance (%) | C/N (dB) |
| Example 1 | 23.2 | 57 | 20.1 | 55 | 19.2 | 55 |
| Example 2 | 24.1 | 57 | 20.3 | 54 | — | — |
| Example 3 | 22.9 | 56 | — | — | 18.9 | 53 |
| Example 4 | 22.9 | 56 | 20.8 | 54 | 18.9 | 53 |
| Example 5 | 23.8 | 56 | 21.0 | 53 | 18.9 | 51 |
| Example 6 | 24.0 | 55 | 22.1 | 53 | 19.8 | 53 |
| Example 7 | 23.2 | 54 | 20.9 | 52 | 19.2 | 52 |
| Example 8 | 23.9 | 56 | 21.7 | 53 | 18.6 | 51 |
| Example 9 | 25.3 | 55 | 20.7 | 53 | 19.9 | 53 |
| Example 10 | 26.7 | 54 | 21.3 | 52 | 20.1 | 51 |
| Example 11 | 32.2 | 51 | 26.2 | 39 | 30.9 | 47 |
| Example 12 | 26.3 | 57 | 20.2 | 54 | 19.3 | 53 |
| Example 13 | 23.0 | 56 | 20.2 | 54 | 19.0 | 53 |
| Comparative Example 1 | 27.1 | 57 | 17.2 | 38 | 11.2 | 30 |
| Comparative Example 2 | 26.8 | 58 | 19.8 | 48 | 15.9 | 35 |

EXAMPLE 14

A solution prepared by dissolving 0.6% by weight of the above listed Compound No. 29 in 1,2-dichloroethane was coated on an acryl substrate having a guide groove of a light-curable resin to form a recording layer having a thickness of 500 Å. A protective layer was applied on the above prepared recording medium by intervening a spacer.

A signal of 0.7 MHz was recorded on the above recording medium by a semi-conductor laser light of a wavelength of 780 nm under the conditions of beam diameter of 1.6 um, linear velocity of 1.4 m/sec and recording surface beam power of 3 mW.

The recorded signal was regenerated by irradiating with a continuous beam of 0.2 mW, thus obtaining a CN value of 53 dB.

The same recording medium was preserved for 1000 hours under the conditions of 50° C. and relative humidity of 90%, but the various properties were not changed.

EXAMPLES 15 TO 33

Various recording layers were prepared in the same manner as in Example 14, except that Compound No. 29 was replaced by the Compounds as listed in the following table. The results of C/N values and preservation test are shown in the following table.

| Example No. | Compound No. | Film Thickness (Å) | Additives (to the weight to said compound) | C/N (dB) | After Preservation Test (at 50° C., 90% RH, for 1000 hours) |
| --- | --- | --- | --- | --- | --- |
| 15 | 30 | 400 | — | 53 | no change |
| 16 | 32 | 480 | — | 54 | " |
| 17 | 33 | 510 | — | 53 | " |
| 18 | 32 | 500 | A1 (15%) | 51 | " |
| 19 | 32 | 600 | A2 (5%) | 54 | " |
| 20 | 33 | 450 | A3 (20%) | 50 | " |
| 21 | 35 | 420 | — | 53 | " |
| 22 | 37 | 420 | — | 52 | " |
| 23 | 37 | 390 | A1 (15%) | 51 | " |
| 24 | 37 | 400 | A4 (15%) | 52 | " |
| 25 | 38 | 630 | A2 (5%) | 55 | " |
| 26 | 39 | 450 | — | 54 | C/N valve 2dB lowered |
| 27 | 40 | 510 | — | 54 | no change |
| 28 | 43 | 480 | A5 (10%) | 52 | " |
| 29 | 44 | 510 | — | 53 | " |
| 30 | 42 | 420 | — | 54 | " |
| 31 | 46 | 450 | A1 (15%) | 50 | " |
| 32 | 48 | 480 | — | 53 | " |

| Example No. | Compound No. | Film Thickness (Å) | Additives (to the weight to said compound) | C/N (dB) | After Preservation Test (at 50° C., 90% RH, for 1000 hours) |
|---|---|---|---|---|---|
| 33 | 48 | 480 | A1 (15%) | 51 | " |

A1: (structure shown)

A2: Nitrocellulose

A3: (structure shown)

A4: (structure shown)

A5: (structure shown)

COMPARATIVE EXAMPLE 3

A recording medium was prepared in the same manner as in Example 14, except that Compound No. 29 was replaced by the compound having the following chemical formula.

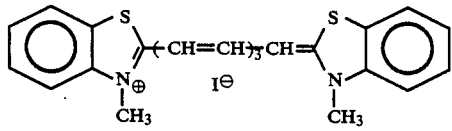

The same test as in Example 14 was carried out, and the measured value of C/N was 53 dB. However, this C/N value was lowered to 41 dB after preservation for 1000 hours under the conditions of 50° C. and relative humidity of 90%.

The optical information recording medium of the present invention having the above mentioned constitution are stable and has satisfactory recording properties. Particularly, the recording medium of the present invention achieves the following effects.

(a) The recording can be effected at a high sensitivity even by using a long wavelength laser (semi-conductor laser).

(b) A pit can be formed in a satisfactory shape and a high C/N value can be obtained.

(c) The stabilities to light and heat are high and the preservability is high. The performance is not degraded even by repeated regeneration.

(d) Manufacturing process is more simple and the manufacturing cost is notably reduced in comparison with the conventional vapor-deposition method.

(e) The sensitivity is higher, and S/N value and contrast are much higher in comparison with the conventional combination system of coloring matter and binder.

What we claim is:

1. An optical information recording element, comprising a substrate and an organic, thin-film, recording layer on said substrate, said recording layer having a thickness of 100 Å-10 μm and containing at least one compound of the formula,

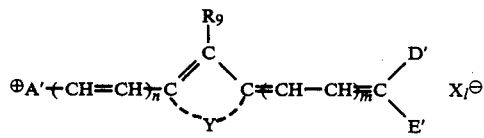

wherein A' represent (1) a heterocyclic group selected from the group consisting of thiazole, oxazole, pyrrole, 3,3-dialkyl indolenine, imidazole, pyridine and quinoline, or (2) said heterocyclic group condensed with a substituted or unsubstituted benzene ring or a substituted or unsubstituted naphthalene ring; D' and E' are the same or different and represent a substituted or non-substituted aromatic hydrocarbon group; X represents an acid anion; l represents 0, 1 or 2 and m and n represent 0, 1, 2 or 3; $R_9$ represents hydrogen, alkyl, amino or halogen; and Y represents atomic groups necessary for forming a substituted or non-substituted five-membered ring or six-membered ring, said recording layer containing an amount of said compound effective to cause said recording layer to undergo optical changes in areas irradiated with laser radiation so that information is recorded based on these optical changes.

2. The optical information recording element according to claim 1, wherein said recording layer is provided with a protective layer.

3. The optical information recording element according to claim 1, wherein an underlayer is interposed between said recording layer and said substrate.

4. The optical information recording element according to claim 3, wherein said recording layer is provided with a protective layer.

5. The optical information recording element, as claimed in claim 1, wherein said substrate is transparent or non-transparent.

6. An optical information recording element as claimed in claim 1, wherein said substrate is transparent for laser light recording and writing on said recording layer is effected by passing laser light to said recording layer through said recording substrate, said substrate being selected from the group consisting of:
glass, polyester, polyamide, polyolefin, polycarbonate, epoxy, polyimide and polymethyl methacrylate.

7. An optical information recording element as claimed in claim 1, wherein said substrate is not transparent to laser light, said substrate being selected from the group consisting of:
metals and ceramics.

8. An optical information recording element as claimed in claim 1, wherein
A' is a heterocyclic group of the formula

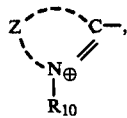

wherein $R_{10}$ is an alkyl selected from the group consisting of methyl, ethyl, n-propyl, isopropyl, n-butyl, secondary butyl, isobutyl, tertiary butyl, n-amyl, tertiary amyl, n-hexyl, n-octyl, and tertiary octyl,
a substituted alkyl selected from the group consisting of 2-hydroxyethyl, 3-hydroxypropyl, 4-hydroxybutyl, 2-acetoxyethyl, carboxymethyl, 2-carboxyethyl, 3-carboxypropyl,
2-sulfoethyl, 3-sulfopropyl, 4-sulfobutyl, 3-sulfatepropyl,
4-sulfatebutyl, N-(methylsulfonyl)-carbamylmethyl,
3-(acetylsulfamyl)propyl, and 4-(acetylsulfamyl)butyl,
cyclohexyl,
allyl,
an aralkyl selected from the group consisting of benzyl, phenethyl, alpha-naphthylmethyl and β-naphthylmethyl,
a substituted aralkyl selected from the group consisting of hydroxybenzyl, carboxybenzyl and sulfobenzyl,
phenyl,
a substituted aryl selected from the group consisting of hydroxyphenyl, carboxyphenyl and sulfophenyl,
and Z is a non-metallic member for forming a heterocyclic group selected from the group consisting of thiazole,
4-methylthiazole, 4-phenylthiazole, 5-methylthiazole,
5-phenylthiazole, 4,5-dimethylthiazole, 4,5-diphenylthiazole,
4-(2-thienyl)-thiazole,
benzothiazole, 5-chlorobenzothiazole,
5-methylbenzothiazole, 6-methylbenzothiazole,
5,6-dimethylbenzothiazole, 5-bromobenzothiazole,
5-phenylbenzothiazole, 5-methoxybenzothiazole,
6-methoxybenzothiazole, 5,6-dimethoxybenzothiazole,
5,6-dioxymethylene benzothiazole, 5-hydroxybenzothiazole,
6-hydroxybenzothiazole, 4,5,6,7-tetrahydrobenzothiazole,
naphtho(2.1-d)thiazole, naphtho(1.2-d)thiazole,
5-methoxynaphtho(1.2-d)thiazole, 5-ethoxynaphtho(1.2-d)thiazole,
8-methoxynaphthol(2.1-d)thiazole, 7-methoxynaphtho(2.1-d)thiazole,
7-methoxythionaphthene(7.6-d)thiazole,
4-methyloxazole, 5-methyloxazole, 4-phenyloxazole,
4,5-diphenyloxazole, 4-ethyloxazole, 4,5-dimethyloxazole,
5-phenyloxazole,
benzoxazole, 5-chlorobenzoxazole, 5-methylbenzoxazole,
5-phenylbenzoxazole, 6-methylbenzoxazole,
5,6-dimethylbenzoxazole, 5-methoxybenzoxazole,
6-methoxybenzoxazole, 5-hydroxybenzoxazole,
6-hydroxybenzoxazole,
naphtho(2.1-d)oxazole, naphtho(1.2-d)oxazole,
4-methylselenazole, 4-phenylselenazole,
benzoselenazole, 5-chlorobenzoselenazole,
5-methylbenzoselenazole, 5,6-dimethylbenzoselenazole,
5-methoxybenzoselenazole, 5-methyl-6-methoxybenzoselenazole,
5,6-dioxymethylenebenzoselenazole, 5-hydroxybenzoselenazole,
4,5,6,7-tetrahydroxybenzoselenazole,
naphtho(2.1-d)selenazole, naphtho(1.2-d)selenazole,
thiazoline, 4-methylthiazoline, 4-hydroxymethyl-4-methylthiazoline, 4,4-bis-hydroxymethylthiazoline,
oxazoline,
selenazoline,
2-quinoline, 6-methylquinoline, 6-chloroquinoline,
6-methoxyquinoline, 6-ethoxyquinoline, 6-hydroxyquinoline,
4-quinoline, 6-methoxyquinoline, 7-methylquinoline,
8-methylquinoline,
1-isoquinoline, 3,4-dihydroisoquinoline,
3-isoquinoline,
3,3-dimethylindolenine, 3,3-dimethyl-5-chloroindolenine,
3,3,5-trimethylindolenine, 3,3,7-trimethylindolenine,
3,3-dimethyl-5,7-dichloroindolenine,
3,3-dimethyl-naphtho(1.2-d) pyrrole, 3,3-dimethylnaphtho(2.1-d) pyrrole, 6-chloro-3,3-dimethylnaphtho(1.2-d) pyrrole,
pyridine, 5-methylpyridine,
1-ethyl-5,6-dichlorobenzoimidazole,
1-hydroxyethyl-5,6-dichlorobenzoimidazole,
1-ethyl-5-chlorobenzoimidazole,
1-ethyl-5,6-dibromobenzoimidazole, 1-ethyl-5-phenylbenzoimidazole,
1-ethyl-5-fluorobenzoimidazole,
1-ethyl-5-cyanobenzoimidazole,
1-(β-acetoxyethyl)-5-cyanobenzoimidazole,
1-ethyl-5-chloro-6-cyanobenzoimidazole,
1-ethyl-5-fluoro-6-cyanobenzoimidazole,
1-ethyl-5-acetylbenzoimidazole,
1-ethyl-5-carboxybenzoimidazole,
1-ethyl-5-ethoxycarbonylbenzoimidazole,
1-ethyl-5-sulfamylbenzoimidazole,
1-ethyl-5-N-ethylsulfamylbenzoimidazole,
1-ethyl-5,6-difluorobenzoimidazole,
1-ethyl-5,6-dicyanobenzoimidazole,
1-ethyl-5-ethylsulfonylbenzoimidazole,
1-ethyl-5-methylsulfonylbenzoimidazole,
1-ethyl-5-trifluoromethylbenzoimidazole,
1-ethyl-5-trifluoromethylsulfonylbenzoimidazole, and
1-ethyl-5-trifluoromethylsulfinylbenzoimidazole.

9. An optical information recording element as claimed in claim 8, wherein

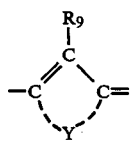

is a five- or six-membered ring selected from the group consisting of:

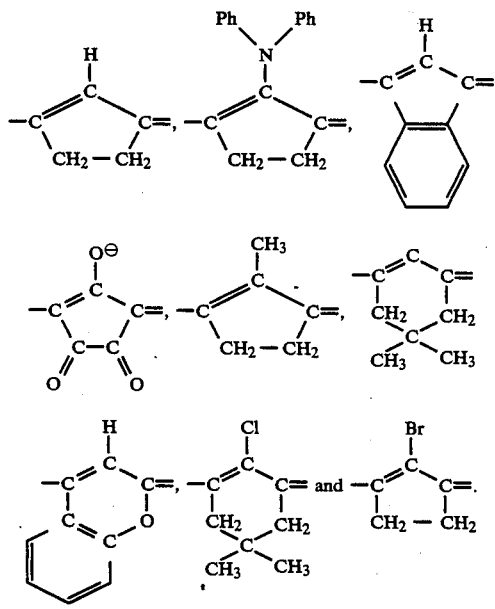

10. An optical information recording element as claimed in claim 9, wherein D' and E' are selected from the group consisting of
phenyl, 4-chlorophenyl, 4-dimethylaminophenyl, 4-diethylamino, 4-dibenzylaminophenyl.

11. An optical information recording medium as claimed in claim 3, wherein said underlayer is 0.1-30 μm in thickness and is selected from the group of materials consisting of: ionomer resins, polyamide resins, vinyl resins, natural high molecular compounds, silicone, liquid rubber, silane coupling agents, SiO$_2$, MgF$_2$, SiO, TiO$_2$, ZnO, TiN, SiN, Zn, Cu, S, Ni, Cr, Ge, Se, Cd, Ag and Al.

12. An optical information recording element as claimed in claim 2, wherein said protective layer is at least 0.1 μm thick and is selected from the group of materials consisting of: ionomer resins, polyamide resins, vinyl resins, natural high molecular compounds, silicone, liquid rubber, silane coupling agents, SiO$_2$, MgF$_2$, SiO, TiO$_2$, ZnO, TiN, SiN, Zn, Cu, S, Ni, Cr, Ge, Se, Cd, Ag and Al.

13. An optical information recording element as claimed in claim 4, wherein said protective layer is at least 0.1 μm thick and is selected from the group of materials consisting of: ionomer resins, polyamide resins vinyl resins, natural high molecular compounds, silicone, liquid rubber, silane coupling agents, SiO$_2$, MgF$_2$, SiO, TiO$_2$, ZnO, TiN, SiN, Zn, Cu, S, Ni, Cr, Ge, Se, Cd, Ag and Al.

14. An optical information recording element comprising a substrate and a recording layer having a thickness of 100 Å to 10 μm and consisting essentially of at least one compound having the formula

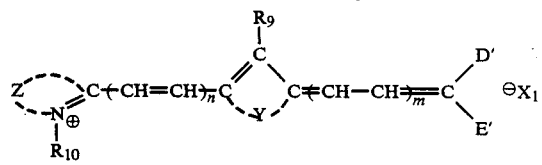

wherein R$_{10}$ is an alkyl selected from the group consisting of methyl, ethyl, n-propyl, isopropyl, n-butyl, secondary butyl, isobutyl, tertiary butyl, n-amyl, tertiary amyl, n-hexyl, n-octyl and tertiary octyl,
  a substituted alkyl selected from the group consisting of 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, 3-(acetylsulfamyl)propyl, and 4-(acetylsulfamyl)butyl,
  cyclohexyl,
  allyl,
  an aralkyl selected from the group consisting of benzyl, phenethyl, alpha-naphthylmethyl and β-naphthylmethyl,
  a substituted aralkyl selected from the group consisting of hydroxybenzyl, carboxybenzyl and sulfobenzyl,
  phenyl,
  a substituted aryl selected from the group consisting of hydroxyphenyl, carboxyphenyl and sulfophenyl;

is selected from the group consisting of thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole,
benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6- dioxymethylene benzothiazole, 5-hydroxybenzothiazole, 6-hydroxybenzothiazole, 4,5,6,7-tetrahydrobenzothiazole, naphtho(2.1-d)thiazole, naphtho(1.2-d)thiazole, 5-methoxynaphtho(1.2-d)thiazole, 5-ethoxynaphtho(1.2-d)thiazole, 8-methoxynaphtho(2.1-d)thiazole, 7-methoxynaphtho(2.1-d)thiazole, 7-methoxythionaphthene(7.6-d)thiazole, 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole, 6-hydroxybenzoxazole, naphtho(2.1-d)oxazole, naphtho(1.2-d) oxazole, 4-methylselenazole, 4-phenylselenazole, benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dioxymethylenebenzoselenazole, 5-hydroxybenzoselenazole, 4,5,6,7-tetrahydroxybenzoselenazole, naphtho(2.1-d) selenazole, naphtho(1.2-d)selenazole thiazoline, 4-methylthiazoline, 4-hydroxymethyl-4-methylthiazoline, 4,4-bis-hydroxymethylthiazoline, oxazoline, selenazoline, 2-quinoline, 6-methylquinoline, 6-chloroquinoline, 6-methoxyquinoline, 6-ethoxyquinoline, 6hydroxyquinoline, 4-quinoline, 6-methoxyquinoline, 7-methylquinoline, 8-methylquinoline, 1-isoquinoline, 3,4-dihydroisoquinoline, 3-isoquinoline, 3,3-dimethylindolenine, 3,3-dimethyl-5-chloroindolenine, 3,3,5-trimethylindolenine, 3,3,7-trimethylindolenine, 3,3-dimethyl-5,7-dichloroindolenine, 3,3-dimethyl-naphtho(1.2-d) pyrrole, 3,3-dimethyl-naphtho(2.1-d) pyrrole, 6-chloro-3,3-dimethyl-naphtho(1.2-d) pyrrole, pyridine 5-methylpyridine, 1-ethyl-5,6dichlorobenzoimidazole, 1-hydroxyethyl-5,6-dichlorobenzoimidazole, 1-ethyl-5-chlorobenzoimidazole, 1-ethyl-5,6-dibromobenzoimidazole, 1-ethyl-5-phenylbenzoimidazole, 1-ethyl-5-fluorobenzoimidazole, 1-ethyl-5-cyanobenzoimidazole, 1-($\beta$-acetoxyethyl)-5-cyanobenzoimidazole, 1-ethyl-5-chloro-6-cyanobenzoimidazole, 1-ethyl-5-fluoro-6-cyanobenzoimidazole, 1-ethyl-5-acetylbenzoimidazole, 1-ethyl-5-carboxybenzoimidazole, 1-ethyl-5-ethoxycarbonylbenzoimidazole, 1-ethyl-5-sulfamylbenzoimidazole, 1-ethyl-5-N-ethylsulfamylbenzoimidazole, 1-ethyl-5,6-difluorobenzoimidazole, 1-ethyl-5,6-dicyanobenzoimidazole, 1-ethyl-5-ethylsulfonylbenzoimidazole, 1-ethyl-5-methylsulfonylbenzoimidazole, 1-ethyl-5-trifluoromethylbenzoimidazole, 1-ethyl-5-trifluoromethylsulfonylbenzoimidazole, and 1-ethyl-5-trifluoromethylsulfinylbenzoimidazole;

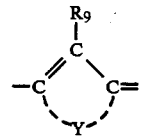

is selected from the group consisting of

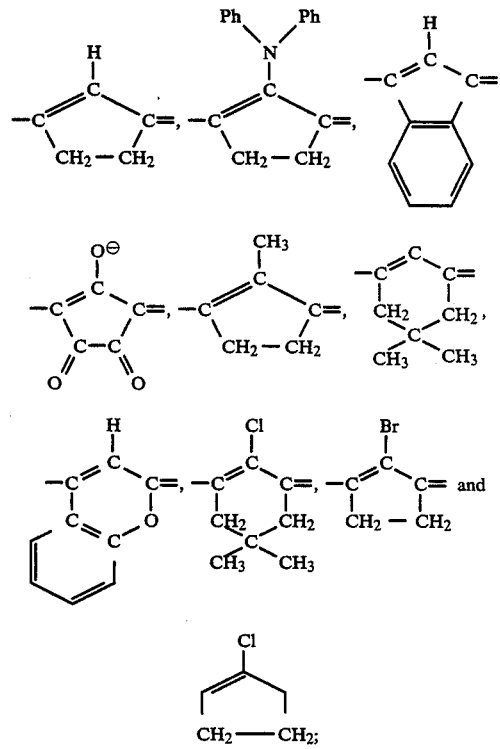

wherein D' and E' are selected from the group consisting of phenyl, 4-chlorophenyl, 4-dimethylaminophenyl, 4-diethylamino and 4-dibenzylaminophenyl;

X' represents an acid anion; 1 represents 0, 1 or 2; and m and n represent 0, 1, 2 or 3.

15. An optical information recording medium as claimed in claim 14 wherein said compound is

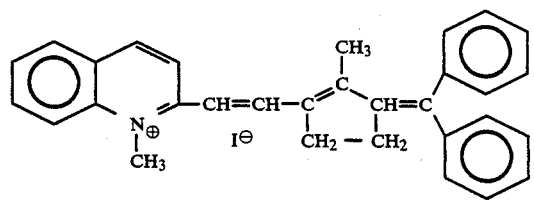

* * * * *

UNITED STATES PATENT AND TRADEMARK OFFICE
CERTIFICATE OF CORRECTION

PATENT NO. : 4,891,305

DATED : January 2, 1990

INVENTOR(S) : Hideaki Oba, et al.

It is certified that error appears in the above-identified patent and that said Letters Patent is hereby corrected as shown below:

Column 28, line 55; change "represent" to ---represents---.

Column 31, line 59; change "claim 9" to ---claim 8---.

Column 33, line 26; after "selenazole" (last occurrence) insert a comma.

Column 33, line 32; change "6hydrox-" to ---6-hydrox- ---.

Column 33, line 45; change "1-ethyl-5,6dichlorobenzoimidazole" to ---1-ethyl-5,6-dichlorobenzoimidazole---.

Signed and Sealed this

Twelfth Day of March, 1991

Attest:

HARRY F. MANBECK, JR.

*Attesting Officer*    *Commissioner of Patents and Trademarks*